United States Patent [19]

Dougherty

[11] Patent Number: 4,773,316
[45] Date of Patent: Sep. 27, 1988

[54] METHOD OF FRYING FOOD AND APPARATUS FOR THE PRACTICE THEREOF

[76] Inventor: Patrick L. Dougherty, 139 N. Old Manor, Wichita, Kans. 67208

[21] Appl. No.: 15,312

[22] Filed: Feb. 17, 1987

[51] Int. Cl.⁴ .............................................. A47J 37/08
[52] U.S. Cl. ...................................... 99/409; 99/401; 99/424; 99/397
[58] Field of Search ................ 99/409, 401, 402, 400, 99/410, 397, 424, 425, 426

[56] References Cited

U.S. PATENT DOCUMENTS

| 101,236 | 3/1870 | Denman et al. | 99/397 |
| 915,105 | 3/1909 | McCaughey | 99/397 |
| 924,336 | 6/1909 | French | 99/424 |
| 951,065 | 3/1910 | Ferguson | 99/401 X |
| 965,755 | 7/1910 | Scherer | 99/401 |
| 1,070,263 | 8/1913 | Knoblock | 99/397 |
| 1,205,461 | 11/1916 | McCulloch | 99/397 X |
| 1,297,549 | 3/1919 | De Witt | 99/401 |
| 1,410,818 | 3/1922 | McCargar | 99/424 |
| 4,176,593 | 12/1979 | Terzian | 99/397 X |

Primary Examiner—Louis K. Rimrodt
Assistant Examiner—J. L. Olds
Attorney, Agent, or Firm—Robert E. Breidenthal

[57] ABSTRACT

The method of frying meat, poultry, sea food, vegetables and the like wherein food is fried on one side and then all such food (which may consist of a multiplicity of discrete pieces) is inverted in unison and the other side of the food is then fried. Practice of the method is facilitated by the provision of a pair of hingedly connected holders for releasably holding food therebetween. The holders are perforated and have separate handles that enable a user to open and close the holders as well as to selectively position the holders in a a fry pan in an upright and an inverted position.

8 Claims, 3 Drawing Sheets

METHOD OF FRYING FOOD AND APPARATUS FOR THE PRACTICE THEREOF

BACKGROUND OF THE INVENTION

1. Field of the Invention

The present invention relates to new and useful improvements in means and methods for frying food such as cut chicken. More particularly, the invention has to do with simultaneously placing a plurality of food pieces in a frying vessel, and after a sufficient interval, simultaneously inverting all the food pieces in the frying vessel, and finally removing all the food pieces simultaneously from the frying vessel.

2. Description of Related Art

The invention involves the use of means for holding or confining food so that the same can be manipulated in carrying out the method of the invention briefly alluded to above.

U.S. Pat. No. 101,236 which issued Mar. 29, 1870, to Denman et al discloses a wire basket for holding meat and which may be hingedly opened and closed. The basket is mounted for rotation about a horizontal axis above a fire so that the meat may be broiled.

U.S. Pat. No. 1,205,461 which issued Nov. 21, 1916, to McCullock discloses hingedly connected gridirons for holding meat in broiling environment. The handles of the gridirons can be used for inverting the meat.

U.S. Pat. No. 637,619 which issued to Flamzberg on Dec. 4, 1906, discloses a meta holder that includes hingedly connected parts having perforate top and bottom plates, the central bottom portion of the lower plate is provided with a depending water vaporizer to keep meat moist during broiling operations.

U.S. Pat. No. 1,070,263 which issued on Aug. 12, 1913, to Knoblock discloses a toaster bearing considerable similarity to U.S. Pat. No. 637,619.

U.S. Pat. Nos. 924,336, 933,545 and 1,010,887 which issued to Helen R. French during the years 1909–1911 are of some pertinence in that two cooking plates are provided in a skillet with one of such plates being pivoted to invert and fold the food cooking thereon over onto the food cooking on the other plate.

U.S. Pat. No. 4,176,593 which issued on Dec. 4, 1979, to Terzian discloses a combined stove and support for side-by-side support of two skillets at predetermined positions. The stove also provides a pivotal connection for one of the skillets so that it may be pivotally inverted and superposed on the other skillet to constitute a closed cover for the latter.

The following U.S. patents are of interest in that each of them discloses hingedly connected and superposed skillets for releasably containing food therebetween. Handles of the skillets are juxtaposed when the skillets are closed, whereby the user can selectively invert the skillets to place first one and then the other on the surface of a stove:

U.S. Pat. No. 951,065 issued to Ferguson on Mar. 1, 1910;

U.S. Pat. No. 1,410,818 issued to McCargar on Mar. 28, 1922;

U.S. Pat. No. 1,987,594 issued to Chiles et al on Jan. 15, 1935;

U.S. Pat. No. 2,061,610 issued to Burnette on Nov. 24, 1936; and

U.S. Pat. No. 366,860 issued to Morgan on July 19, 1887.

SUMMARY OF THE INVENTION

The paramount objective of the invention is to provide a method of and apparatus for frying food, especially such as cut, floured, breaded or batter-coated pieces of chicken, fish or the like, that is convenient, expeditious and productive of a product such that a high degree of uniformity as to the degree of cooking and browning is achieved from piece to piece of cooked food while avoiding any necessity for handling or individually turning any of the pieces after the frying has been commenced.

Another important objective is to provide a method of and apparatus for frying food such as to attain an optimum degree of safety and cleanliness by minimizing the spillage or leakage of cooking oil, while also minimizing the painful splattering of hot cooking oil.

Still another important objective is to provide a method of and apparatus for frying food that is of such versatility as to be applicable to the frying of vegetables such as sliced potatoes and the like, in addition to meat, poultry and fish.

Yet another important objective is to fry a plurality of batter-coated pieces of food in such a manner as to minimize such contact, abrasive or rubbing contact, and collision between the pieces that tend to dislodge batter or crust from the pieces.

A final objective to be expressly stated is to provide cooking apparatus in accordance with the foregoing objectives that can be efficaciously cleaned and readied for reuse, enable novices with only brief instruction to prepare fried foods that would be a credit to a master chef, and which can be equally useful in a private family kitchen as well as in a large commercial restaurant or food preparation establishment.

BRIEF DESCRIPTION OF THE DRAWINGS

Other objectives, features and advantages of the invention will be most readily appreciated in the light of the following description of a preferred embodiment of the invention, such description being given in conjunction with the accompanying drawings illustrative thereof wherein.

DESCRIPTION OF THE PREFERRED EMBODIMENT

Figure 1:
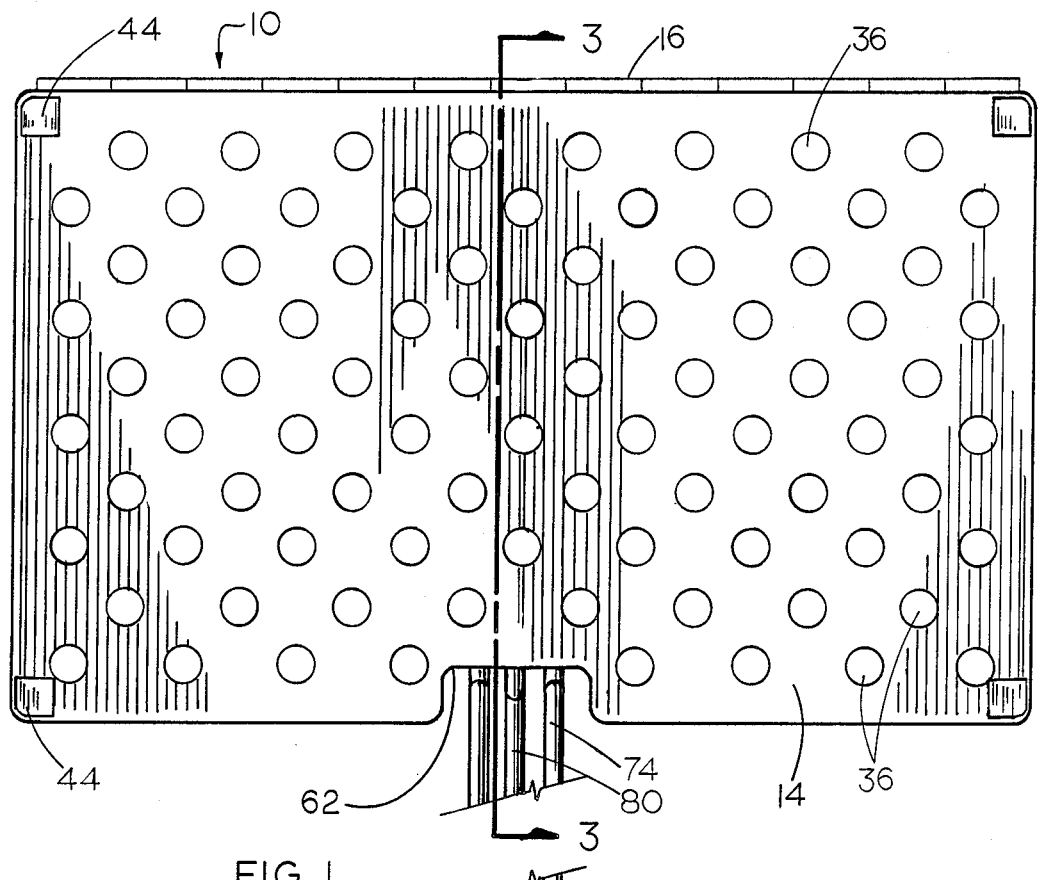
FIG. 1 is a broken top view of the holders, a portion of the extents of the handles being deleted to reduce the size of the drawing.

Referring now to the drawings, wherein like numerals designate like parts throughout the various views, the reference numeral 10 designates a food holder assembly generally, such assembly 10 comprising first and second holders 12 and 14 that are hingedly connected by hinge means 16, and which holders 12 and 14 are respectively attached to handles 18 and 20.

The reference numeral 22 designates an open-topped frying vessel that receives the holder 10 therein with either of the holders 12 or 14 selectively lowermost.

Excepting the handles, the holders 12 and 14 are identical and a detailed description of one will suffice for both. The holder 12 comprises a generally planar and horizontally disposed member that is provided with a continuous and integral wall 32 of uniform height about its periphery.

The member 30 is shown as having a generally rectangular peripheral configuration and it is to be emphasized at this point that such need not necessarily be the case and it will become manifest to those of modest skill in the art that a wide selection of peripheral configurations may be employed such as trapezoidal, regular polygonal, elliptical, circular and so on. It should also be made clear at this point that although the peripheral wall 32 is shown as being vertical, such wall 32 can, as will become quite evident, be upwardly and outwardly inclined, and may conveniently be of arcuate character to present an outwardly convex surface, if desired. Whatever the choice for the peripheral configuration of the member 30 and the choice of configuration of the peripheral wall 32, it will be understood that it is preferred that the entire extent of the upper edge 34 of the peripheral wall 32 terminate in a plane parallel to and spaced above the member 30.

Figure 4:
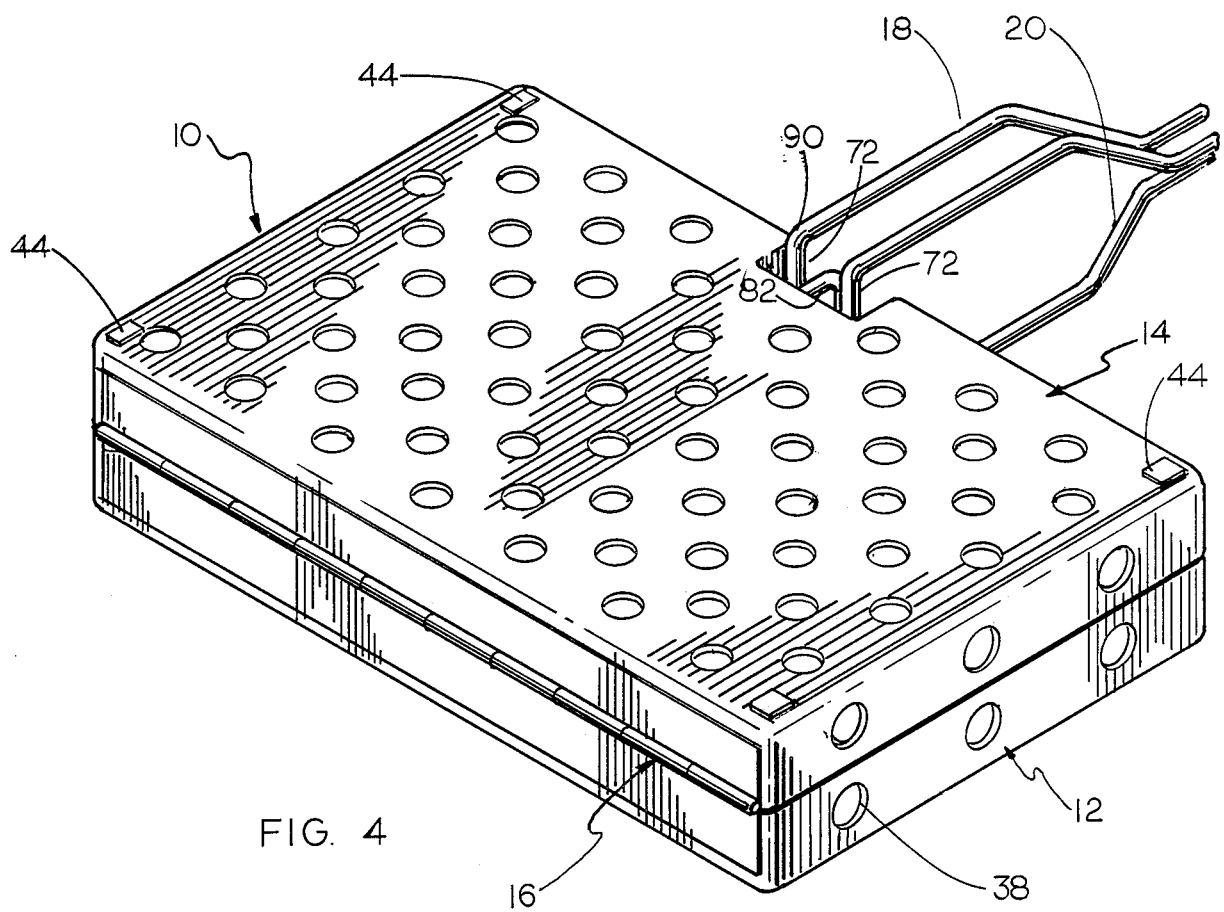
FIG. 4 is an isometric view of the holders taken from the end of their hinged connection, with a portion of the handles being broken away to reduce the size of the drawing.

As inspection of the drawings, particularly FIG. 4, will show it is preferred that the maximum horizontal extent of the plate 30 substantially exceed and most preferably be a multiple of the height of the peripheral wall 32.

Figure 2:
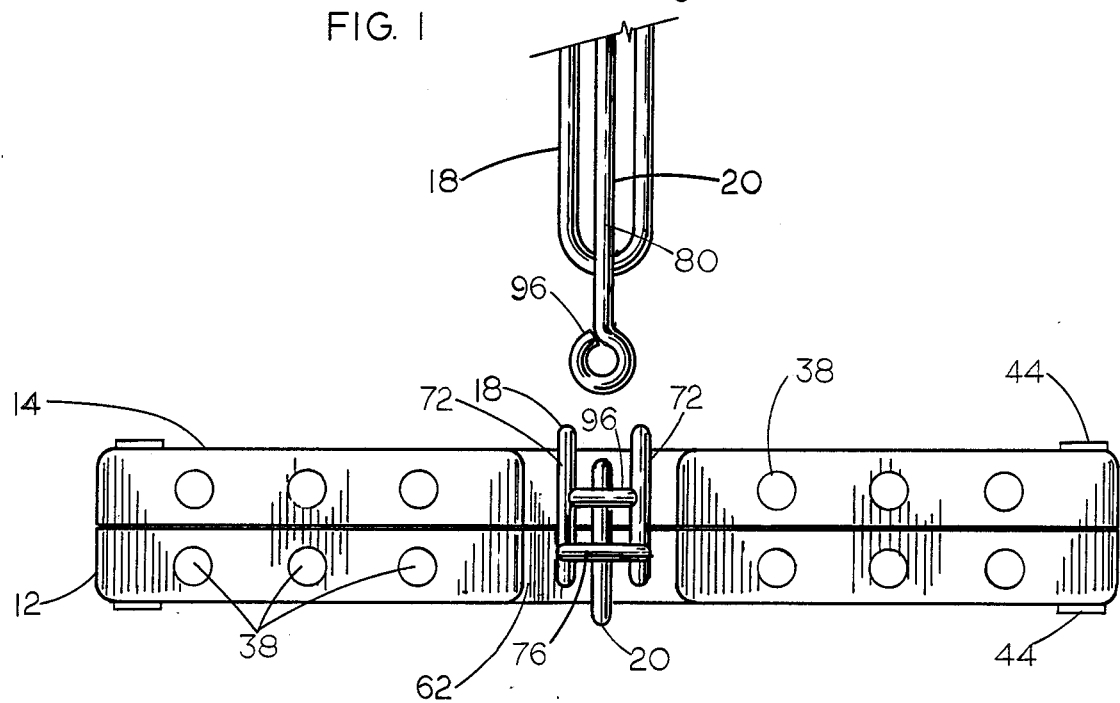
FIG. 2 is a handle end elevational view of the holders showing the same in closed relation to each other.

For a purpose to be presently explained, the member 30 is provided with a plurality of openings or apertures 36 therethrough, and optionally the peripheral wall 32 is provided with spaced openings or apertures 38 therethrough as clearly shown in FIGS. 2 and 4. It will be noted that the total perforate area constituted of the perforations or apertures 36 is less than one half of the total horizontal area of the member 30. Also, the spacing of the perforations relative to two normal directions is quite apparent.

While actual tests of the illustrated apparatus have not shown such as providion to be necessary or certainly not to be essential, means may optionally be provided for preventing or inhibiting the movement of food pieces about the upper surface of the member 30 when supported on the latter. Such means can be in the form of upstanding pointed tangs fixed to the upper side of the member 30 such as the tang shown at 40 in FIG. 3.

For reasons to be more fully explained subsequently, thin protective pads 44 are secured to the underside of the member 30 at spaced positions spaced about its periphery such as those shown near the corners of the member 30 in FIGS. 1 and 2.

The open-topped vessel or fry pan 22 has a flat bottom wall 50. While it is only essential that the vessel 22 be large enough to receive the holder 10 therein so that the member 30 seats reasonably flush against the bottom wall 50, it is highly preferred that the peripheral configuration of the bottom wall 50 be conformable to and only larger than the member 30 to a minimum extent commensurate with ease of insertion and removal of the holder 10 from the vessel 22. The bottom wall 50 of the vessel 22 is provided with an upstanding peripheral wall 52, and it is highly preferred that the wall 52 be generally conformable to the wall 32 with a minimum clearance therebetween commensurate with unimpeded insertion and removal of the holder 10 from the vessel 22.

While small clearance as described is highly preferable, reasonably good results are obtained if corresponding horizontal dimensions of the vessel do not exceed those of the holder 12 by more than one-half inch on average.

In any event vessel dimensions should not exceed holder dimensions more than about 10 to 15 percent.

Ideally, the member 30 will seat flush against the wall 50, though it will be recognized that manufacturing departures of such elements from flatness and subsequent normal distortion of such elements as will occur from usage, effects of high temperatures will preclude such ideal seating as a practical matter. Accordingly, as used in this specification and the appended claims, the expression "contact", "engagement", or the like with respect to the elements 30 and 50 will ordinarily mean actual contact at a plurality of places with such elements otherwise being in close proximity over the remainder of their superimposed areas with a view to optimizing heat exchange therebetween. The pads 44 are either sufficiently conductive in their own right or of such area and thinness as to allow an adequately efficient heat exchange.

It will be noted that the holder 14 is inverted and superposed on the holder 12 so that the edges 34 of such holders seat against each other in opposed fashion at a plane of symmetry of such holders as thus far described. The edges 34 of the holders 12 and 14 are shown slightly separated in the drawings to improve the clarity of the latter.

The hinge means 16 can be in the form of a conventional piano hinge as shown, though any other form definitive of a horizontal pivotal axis adjacent to the juncture of the walls 32 and in alignment with the local extent of the latter can be used. Should the holders be of a generally circular configuration, the axis of the pivotal connection would be substantially tangential to the local extent of the peripheral walls 32. Such would be rather analogous to the hinged connection of the parts of a conventional round lady's compact or make-up box.

If desired or deemed expedient, the hinge means 16 can be of detachable character such as those shown in the prior art previously cited (the disclosures of which are incorporated herein by reference). Such detachability of the holders at their hinged connection may be considered preferable from the standpoint of facilitating cleaning by reducing the size of the components to be handled.

Figure 6:
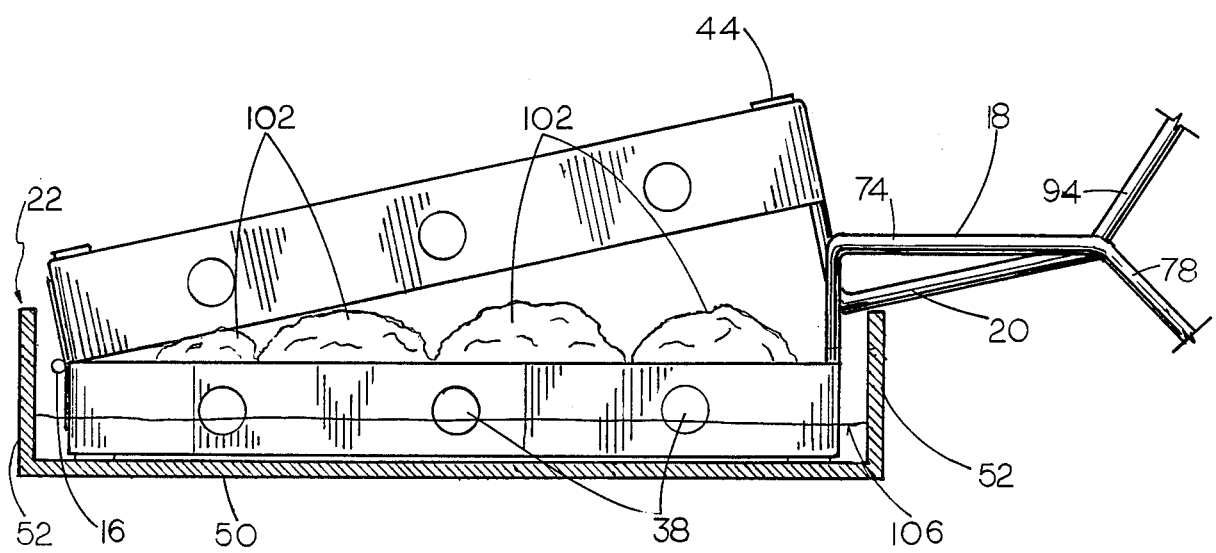

The hinge means 16 enables the holders 12 and 14 to be swung apart from the closed relationship shown in all the drawings except FIG. 6 wherein the same are shown partially opened. If desired the hinge means 16 enables the holders 12 and 14 to be opened 180° so that they can rest side by side on a common horizontal supporting surface, not shown, or as will be seen presently, suspended in opened condition from a support, not shown, against a vertical wall, also not shown.

A departure from the desired conformity or generally mating configurations of the holder 12 and the vessel 22 occurs in the vicinity of the locations at which the handles 18 and 20 are attached to the holders 12 and 14.

As clearly shown in the drawings, the periphery of the member 30 of the holder 12 as well as its counterpart of holder 14 is indented from the general peripheral configuration thereof at a position diametrically opposed to the location of the hinge means 16, such indentation or recess is indicated at 60, and it will be evident on inspection of the drawings that the peripheral wall 32 conforms to such indentation, with such conforming portion of the peripheral wall 32 being indicated at 62.

It is to be noted that the periphery of the vessel or fry pan 22 does not conform to the indentation 62 as one of the purposes of the latter is to provide an enlarged space 66 between the holders 12 and the vessel 22 as shown in FIG. 6.

As thus far described, the holders 12 and 14 are mirror images of each other.

The handle 18 is fixedly secured to the wall portion 62 and extends thereabove to a height greater than the height of the wall 32 inclusive of its portion 62, and the handle 18 thence extends in a generally horizontal direction from the holder 12 and the hinge means 16. The handle 20 is fixedly secured to and associated with the holder 14 in a substantially analogous manner; however, it is to be expressly noted that the handles 18 and 20 are horizontally offset from each other so that neither is in the travel path of the other. This latter imperative precludes the handles sharing the plane of symmetry of the holders 12 and 14. If desired or deemed expedient, the holders 12 and 14 together wtih their attached handles can be identical to each other and meet the criteria given above as will be evident to those familiar with the art. Whether such a choice is made in the light of these teachings or not, the vertical extent of the handles immediately adjacent the wall 62 is such that a vertical projection thereof falls within the area of indentation so that such vertical handle extent lies within the general outline or configuration of the members 30 to the end that the handles will not preclude horizontal contact of the wall 32 with the wall 52 of the vessel 22.

Figure 3:
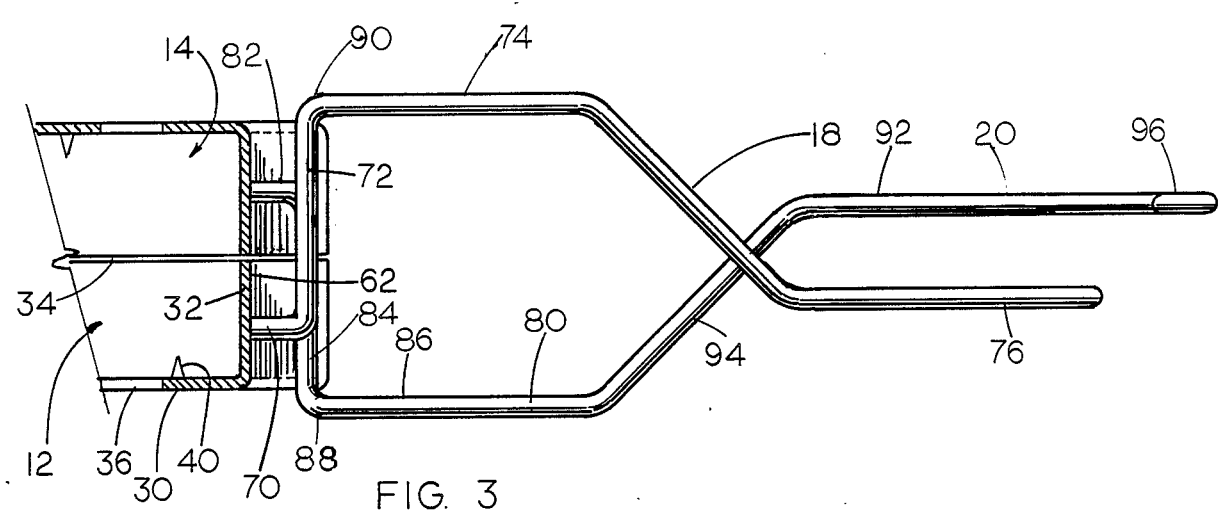
FIG. 3 is an enlarged vertical sectional detail view taken upon the plane of the section line 3—3 in FIG. 1.

In the illustrated form the handle 18 comprises a rod 68 of a generally U-shaped configuration with a vertical plane of symmetry and having end portions 70 securely fixed as by welding or the like to the indented wall 62, as best shown in FIGS. 1 and 3. The rod 68 is bent to extend vertically 72 upward from the portion 70 in the space 66 of the indentation 62 to a height spaced well above the upper end of the wall 32 as well as above the height of the pan wall 52 as evident on inspection of FIGS. 3 and 6.

Figure 5:
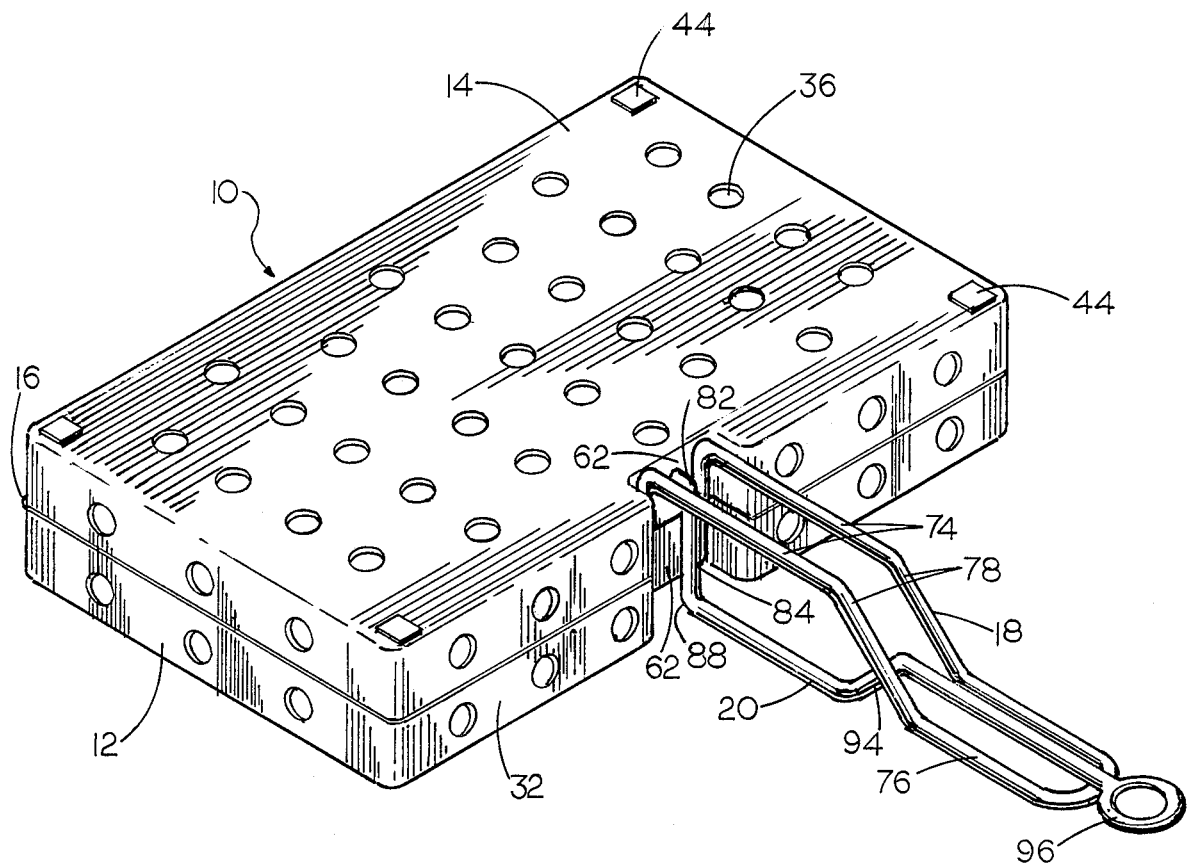
FIG. 5 is an enlarged fragmentary isometric view of the attachment of the handles to an indented peripheral portion of the holders; and, FIG. 6 is a side view of the holders during partially opened cooking use thereof eithin an open-topped cooking vessel of rectangular configuration, the latter having its near side wall omitted to reveal the holders therein.

The rod 68 thence extends horizontally from the portions 72 in the form of rod portions 74. The horizontally extending bight portion 76 of the handle is integrally connected to the portions 74 by inclined portion 78 in an arrangement that spaces the bight portion 76 below the free end of the handle 20 as shown in FIG. 5.

The handle 30 is a rod having a single end portion 82 fixedly secured to the indentation portion of the wall of the holder 14.

The rod 80 extends vertically from its end portion 82 as vertical portion 84 which in turn is connected to a horizontal portion 86.

The vertical portion 84 is disposed in the space 66 and the position of the juncture 88 of the portions 84 and 86 is spaced (as viewed in side elevation) from the holder 14 the same as the junctures 90 of the portions 72 and 74.

The horizontal outer portion 92 of the handle is connected to the rod portion 80 by an inclined portion 94, and the free end of the handle 20 terminates in an eye 96.

It will be evident from FIG. 1 that the handle 20 is disposed in the plane of symmetry of the handle 18. The apparatus can be hung from a wall support, not shown, by either the eye 96 or the bight portion 76 with the holders 12 and 14 either opened or closed.

It will be noted that the handles 18 and 20 coact with the pan 22 in identical fashions when the holder 10 is inverted, and that in addition to affording substantial clearance of the upper edge of the pan 22 by the handle of the lowermost holder, the arrangement provides sufficient clearance for the electrical controls, plug and socket housings and the like that are conventional on electric fry pans or skillets, should the cook choose to use such a device in lieu of the simple fry pan indicated at 22. Such a choice may be strongly indicated, especially when the conventional electric fry pan includes a thermostatically controlled electric heating element that can be set to a selected temperature.

The illustrated handle configuration also allows the handle of the uppermost holder to rest on the rim of the fry pan, with the hinge 16 allowing the holders to open to the extent necessary.

While the holder 10 can be made of any suitable material that can withstand the described environment of its use, transfer heat adequately, be resistant to corrosion, easy to clean, and not contaminate the food in any way. The holder is preferably fabricated of metal, with stainless steel being especially preferred because of its bright appearance and resistance to corrosion. The use of metallic construction is also indicated because of typically relatively higher thermal conductivity.

The holder portions can and preferably are provided with overall thin surface coating of a substance such as tetrafluoroethylene resin or the like such as marketed by DuPont under the trademark TEFLON for the purpose of minimizing the adherence of food thereto. Provision of such a coating essentially precludes sticking of the holder 10 to the pan 22. Provision of such a coating usually obviates any need for the pads 44.

Conventional fry pans such as the pan 22 are often lined with a tetrafluoroethylene resin or the like. Such linings are susceptible to mechanical damage, and the principal purpose of the pads 44 (preferably made of tetrafluoroethylene resin or the like) is to minimize or eliminate damage to such a lining by the holder 10.

In use, a suitable cooking oil 100 is placed in the vessel 22 and brought to a temperature of about 300° to 350° F. by applying heat to the bottom of the vessel. With the holder 10 remote from the vessel 22, cut pieces of chicken are conventionally coated with batter, flour or breading, and placed, with the holder 10 being open, in a horizontally distributed fashion as indicated at 102 in FIG. 6. The holder 10 is then closed insofar as possible by manipulation of the handles 18 and 20 so as to confine the pieces of chicken in a zone defined by the closed or substantially closed holder. The handles 18 and 20 may then be gripped in one hand of the user, and while being held, the user places the holder 10 in the fry pan or vessel 22 so that the member 30 of the lowermost holder 12 or 14 is in heat exchange relation with the bottom wall 50 of the vessel 22.

Such placement of the holder 10 in the vessel 22 results in heated cooking oil entering the lowermost holder 12 or 14 through openings 36 so that the lowermost part of all the chicken pieces 102 are immersed in hot cooking oil. The amount of oil placed in the pan 22 is preferably such that the level thereof rises to some level below the upper edge of the wall 32 to such as that indicated at 106 in FIG. 6.

The application of heat to the bottom wall 50 of the vessel 22 is continued to maintain the oil at a temperature of about 300° to 350° F. and to apply heat to chicken in contact with the member 30 by reason of the thermal conductivity of the latter and by reason of its heat exchange relation with the bottom wall 50 of the vessel 22. Such first cooking phase or interval should be carried out about 5 to 20 minutes, after which the user manipulates the handles 18 and 20 to raise the holder 10 sufficiently so that the latter may be inverted and replaced in the vessel 22 in the same relationship as described above except for the roles of the holders 12 and 14 now being reversed.

The holder 10 is held directly above the vessel 22 during the inverting step so that all oil dripping therefrom falls back into the vessel 22.

The holder 10 need not be elevated to any significant height above the vessel to perform the inverting step and the user may allow the holder 10 and its contents to rest upon the bottom wall 50 to some extent during all or a considerable portion of the inverting operation.

After the inversion has been completed, the application of heat is continued as during the first cooking interval to maintain the oil at a temperature in the range of about 300° to 350° F. for an interval of about 5 to 15 minutes. Usually the second cooking interval can be of a shorter interval than the first or initial interval.

At the end of the second cooking interval, the holder 10 can be removed from the vessel 22 and placed on a drip pan, not shown, and the holder 10 opened to release the pieces 102 from confinement for serving.

If desired or deemed convenient, the holder 10 can be opened and the chicken served therefrom while the holder 10 remains in the vessel 22, though this is not preferred.

The desired close conformity in size of the vessel 22 to the holder 10 results in a minimization of the amount of cooling oil required, and it has been found that the hot residual oil remaining in the vessel 22 after the holder 10 is removed is about ideal in amount for addition of the conventional ingredients such as flour, milk or water, and spices for the preparation of old fashioned pan gravy to which it lends the flavor and aroma that it attained during its prior cooking contact with the chicken.

While conventional methods of frying chicken in a skillet with a minimum of oil involve the turning of individual pieces and the exercise of considerable skill and judgment as to which pieces and when they need turning, the method of the instant invention requires no such skill or judgment as all pieces are turned simultaneously with substantially reduced likelihood of different parts of a piece of chicken being cooked to a markedly different degree. Also the inhibiting of relative motion of the pieces of chicken reduces the dislodgment of batter or crust.

While the frying of chicken has been stressed and in fact is deemed to be the principal utility of the method and apparatus, it is obvious that the invention has utility in frying other foods such as fish or the like. Indeed, the invention is deemed to have potential utility in the frying of vegetables such as okra, potatoes, bread and the like.

The advantage of having the handles extend upwardly immediately adjacent the attachment to the wall 62 to a height considerably greater than that of the wall 62 will be evident on inspection of FIGS. 5 and 6. It will be seen that the upward extension 74 of the handle 18 allows the holder 12 to rest on the bottom wall 50 even though the holder 12 otherwise is of substantially lesser height than the wall 52 of the vessel 22. It will be noted that the arrangement is such that the handle 20 contacts and rests upon the upper edge of the wall 52 in a manner that the holder 10 is partially opened on the holder 14 being tilted up a bit. This is not a disadvantage when the height of the wall 52 is so high as to partially open the holder 10 as the food is not actually released from confinement, and is of advantage in that it reduces splatter of hot cooking oil, and does not steam the food being fried.

Having fully described the invention, its structure and its practice, attention is now directed to the appended claims to ascertain the actual scope of the invention.

I claim:

1. Apparatus for the frying of food comprising a pair of holders, each of said holders comprising a horizontal member provided with an integral upstanding peripheral wall, said member having a planar lower surface adapted to seat flush against a planar heating surface, said peripheral wall being of substantially lesser height than the horizontal extent of the member, said horizontal member being perforate by way of being provided with a plurality of perforations therethrough spaced in one direction as well as in a second direction normal thereto, with the total area of the perforations being less than one half the total area of the member, one of said holders being inverted and superposed upon the other with the peripheral walls being in opposed engagement with each other, means hingedly connecting the holders for relative movement about a horizontal axis adjacent a juncture of the peripheral walls, whereby the holders can be swung open for placement of food therebetween for confinement therebetween on subsequent closing movement of the holders, each of said holders being provided with a handle attached thereto at a position diametrically opposed to the hinge means, with the handle extending horizontally therefrom in an arrangement such that a user can grasp both handles in one hand and thereby enable the user to hold the holders in as closed relationship as permitted by food therebetween, and whereby the user can manipulate the so-held holders any food confined thereby in unison.

2. The combination of claim 1, wherein the holders have a horizontal plane of symmetry and enclose a substantially unobstructed free space when in closed relation to each other.

3. Apparatus for the frying of food comprising a pair of holders, each of said holders comprising a horizontal planar member provided with an integral upstanding peripheral wall, of substantially lesser height than the horizontal extent of the member, said horizontal member being perforate, one of said holders being inverted and superposed upon the other with the peripheral walls being in opposed engagement with each other, means hingedly connecting the holders for relative movement about a horizontal axis adjacent a juncture of the peripheral walls, whereby the holders can be swung open for placement of food therebetween for confinement therebetween on subsequent closing movement of the holders, each of said holders being provided with a handle attached thereto at a position diametrically opposed to the hinge means, with the handle extending horizontally therefrom in an arrangement such that a user can grasp both handles in one hand to manipulate the holders and any food confined thereby in unison an open-topped vessel having a flat bottom wall and an upstanding peripheral wall, the arrangement being such that the holders can be placed in the vessel with the planar member of the lowermost holder in contact with the bottom wall of the vessel, with the peripheral wall of the vessel having a height such as to extend above the height of the horizontal axis when the planar member of the lowermost holder contacts the bottom wall of the vessel.

4. The combination of claim 3, wherein the peripheral configurations of the holders and the vessel are substantially similar with the horizontal dimensions of the vessel exceeding the corresponding dimensions of the holders by less than about 15%, whereby the peripheral walls of the vessel and of the holders are closely spaced when the latter is received in the former.

5. The combination of claim 4, wherein overall transverse horizontal dimensions of the vessel exceed corresponding dimensions of the holders by less than about one inch on average.

6. Apparatus for the frying of food comprising a pair of holders, each of said holders comprising a horizontal planar member provided with an integral upstanding peripheral wall, of substantially lesser height than the horizontal extent of the member, said horizontal member being perforate, one of said holders being inverted and superposed upon the other with ther peripheral walls being in opposed engagement with each other, means hingedly connecting the holders for relative movement about a horizontal axis adjacent a juncture of the peripheral walls, whereby the holders can be swung open for placement of food therebetween for confinement therebetween on subsequent closing movement of the holders, each of said holders being and with each of the handles being offset vertically at its position of attaching to its respective holder.

7. The combination of claim 6, wherein the holders are peripherally indented at the positions of attachment of the handles thereto, whereby the handle of the lowermost holder projects horizontally outwardly from the holder at a height spaced above that of the peripheral wall of such holder.

8. The combination of claim 1, wherein the horizontal members of the holders are of heat conductive material, and wherein the horizontal members are provided with integral, vertically projecting tangs to constitute means for inhibiting sliding movement of food in contact with such member.

* * * * *